United States Patent [19]

Gilman et al.

[11] 3,990,317
[45] Nov. 9, 1976

[54] MECHANISM FOR CONVERSION BETWEEN ROTARY AND LINEAR MOTION

[75] Inventors: Stanley H. Gilman, White Plains; Daniel H. Marcus, New City, both of N.Y.

[73] Assignee: Gilman Manufacturing Corporation, White Plains, N.Y.

[22] Filed: Feb. 21, 1975

[21] Appl. No.: 551,613

[52] U.S. Cl. .................................................. 74/25
[51] Int. Cl.² ........................................ F16H 21/16
[58] Field of Search ........................................ 74/25

[56] References Cited
UNITED STATES PATENTS

| | | | |
|---|---|---|---|
| 2,511,243 | 6/1950 | Brubaker | 74/25 |
| 3,376,019 | 4/1968 | Weiss | 74/25 |

*Primary Examiner*—Samuel Scott
*Assistant Examiner*—Wesley S. Ratliff, Jr.

[57] ABSTRACT

A pair of wire positioning guides having spaced-apart parallel edges define a channel within which a wire is confined. A pair of wire engaging rollers are rotatably disposed along the channel on opposite sides of the guides. The rotational axes of the rollers define an acute angle with respect to the channel. Rotational movement of the rollers is thus interlocked with linear movement of the wire.

11 Claims, 8 Drawing Figures

3,990,317

MECHANISM FOR CONVERSION BETWEEN ROTARY AND LINEAR MOTION

BACKGROUND OF THE INVENTION

This invention relates to a mechanism for conversion between rotary and linear motion, and more particularly to such a mechanism in which a wire or shaft is held between rotatable rollers, the rotational axes of the rollers forming an angle with the wire.

It is an object of the present invention to provide an improved mechanism for conversion between rotary and linear movement which is simple and inexpensive to fabricate and does not have high frictional losses.

Most conventional mechanisms for conversion between rotary and linear motion are dependent upon various types of gears, the most common being rack and pinion arrangements. Many such devices are characterized by high fabrication expenses associated with the cutting of gear teeth and the close tolerances required. In addition, there are often undesirable lubrication requirements and high frictional losses. Another problem associated with the use of such gears is backlash. Moreover, many prior art devices are capable of moving through only a relatively short linear path before they must be interrupted and recycled. Others are not suitable for relatively fine adjustments.

An improved solution to the problem of conversion between linear and rotary motion is disclosed in U.S. Pat. No. 3,081,639 issued to Murray L. Hauptman on Mar. 19, 1963 and entitled "Feed Mechanism."

In the Hauptman device, a shaft is advanced by rollers disposed at an incline or angle to the rotational axis of the shaft. A difficulty is encountered, however, in applying this principle to a relatively thin wire because more than two rollers of suitable diameter will interfere with each other before they engage the wire. (The term wire is used herein to refer to any small diameter shaft or cable regardless of its flexibility or the use to which it is put that presents the problem of not being readily engageable by more than two rollers simultaneously.)

SUMMARY OF THE INVENTION

In the mechanism of the present invention, a wire to be linearly advanced is confined between a pair of wire positioning guides having spaced-apart parallel opposing edges which define a channel therebetween. A pair of wire engaging rollers are rotatably disposed along the channel on opposite sides of the guides and free of engagement with the guides. The rotational axes of the rollers define an angle with respect to the channel. Accordingly, if the rollers are driven in a rotary fashion, the wire is then moved linearly at a rate of speed dependent upon (1) the rotational speed of the rollers and (2) the angle between the rollers and the channel.

In a preferred embodiment, the rollers are held within opposing spiral slots in a roller housing. The wire positioning guides are fin shaped.

In one embodiment, the roller housing is encircled by a rotatable race, and the rollers are driven by rotation of the race with respect to the housing. A thrust bearing may be used to prevent linear movement between the roller housing and the race.

It is also possible to drive the rollers relative to the wire by rotating the roller housing about the wire.

BRIEF DESCRIPTION OF THE DRAWINGS

For a more detailed understanding of the invention, reference may be made to the description below taken in conjunction with the appended drawings wherein.

DESCRIPTION OF THE PREFERRED EMBODIMENTS

Figure 1:
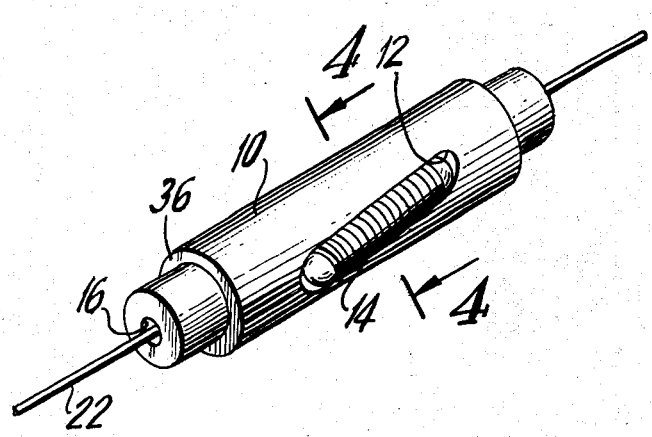
FIG. 1 is a three-dimensional pictorial view of a mechanism for converting between rotary and linear motion constructed in accordance with the invention.

FIG. 1 shows a mechanism for converting between rotary and linear motion which includes a cylindrical roller housing 10 having formed therein two parallel diametrically opposed spiral elongated roller positioning slots 12, each of which contains a rotatable roller 14. An opening 16 through which a wire can be advanced linearly extends axially through the housing 10.

Figure 2:
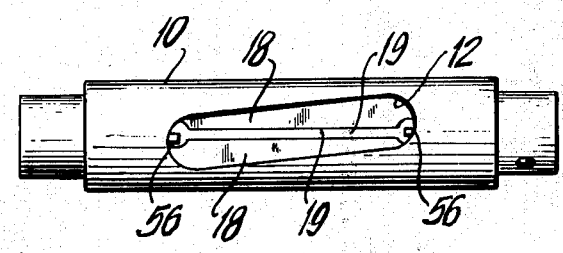
FIG. 2 is a planar view of a portion of the mechanism shown in FIG. 1.

Within the housing 10 is a pair of integrally formed fin-shaped wire positioning guides 18, which are more clearly shown in FIG. 2. Each guide 18 is a curved surface defining an edge extending axially along a portion of the opening 16 in the housing 10 although the curvature is not sufficiently pronounced to be observable in the drawing. The opposed edges 19 are parallel and spaced-apart by a distance slightly greater than the diameter of the wire to be passed through the opening 16. Thus, the guides 18 define a wire channel co-extensive with a portion of the opening 16 through which the wire passes.

Figure 3:
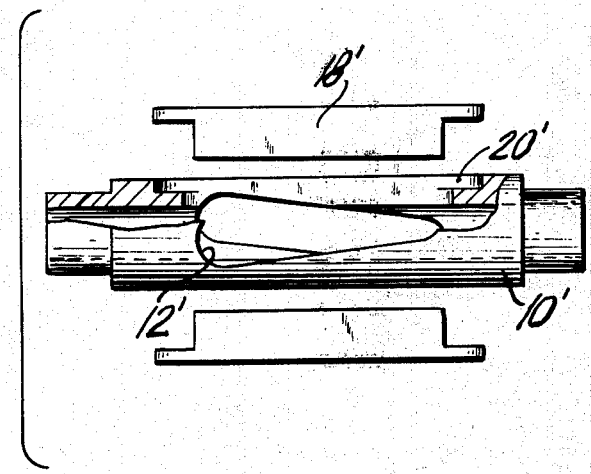
FIG. 3 is a modified version of the same portion of the mechanism that is shown in FIG. 2.

FIG. 3 is an exploded fragmentary view of a variation of the roller housing 10' and guides 18' which correspond to FIG. 2. According to this alternative construction, the spacing and alignment of the guides 18 is adjustable as they are received in the housing 10'. This construction is advantageous in that the guides 18 may be constructed of a harder metal than the housing 10 and may be adjusted to compensate for wear or to realign the edges of the guides 18'. The guides 18' may be made of flexible sheet-like material for radial insertion in spiral defining slots 20' formed in the housing 10'. Alternatively, the guide members 18' may be rigid and shaped to conform to the slots.

Figure 4:
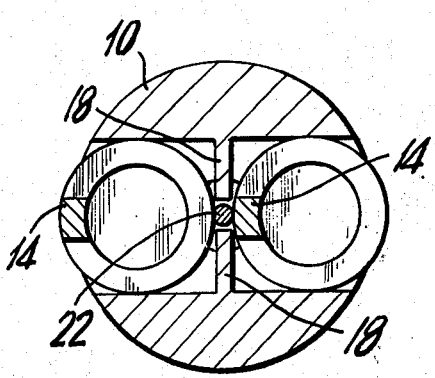
FIG. 4 is a cross-sectional view of the apparatus of FIG. 1 taken along the line 4—4.

FIG. 4 is a cross-sectional view of the housing 10 taken along the line 4-4 showing the interaction of the rollers 14 and guides 18 with a wire 22. Since there are only two rollers 14, the spacing between them can be made as small as desired and they do not interfere with each other. Accordingly, the mechanism may be used with a very small diameter wire, which may be any type of small shaft or cable. For example, the invention has been used to advance a 0.035 inch diameter welding wire. Since there are only two rollers 14, they do not interfere with each other, although they are considerably larger in diameter than the wire. The function of the guides is to prevent the wire 22 from moving sideways away from the pont at which the two rollers 14 are closest together.

As shown in FIGS. 1 and 2, the slots 12 are inclined and form an acute angle with respect to the channel between the guides 18 and with respect to the longitudinal axes of the housing 10. Thus, the rotation of the rollers 14 within the slots 12 produce a linear movement of the wire within the channel. The greater the angle formed by the axes of rotation of the rollers with respect to the channel, the greater the linear advancement of the wire with each rotation of the rollers 14.

It should be noted that, conversely to the above described mode of operation, if the roller housing 10 is held against linear movement while the wire 22 is moved linearly, the mechanism serves to convert from linear movement to rotational movement, as rotation of the rollers 14 is thereby produced.

Figure 7:
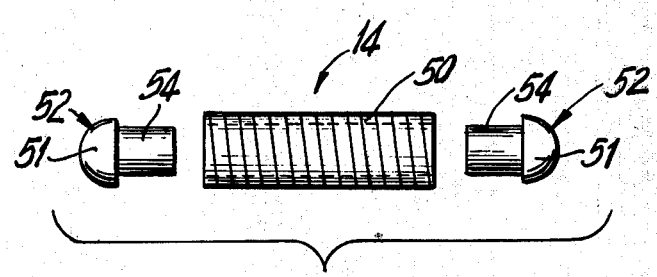
FIG. 7 is a planar view of a preferred form of a roller used in the mechanism of FIG. 1.

FIG. 7 shows a preferred construction of one of the elongated rollers 14 in which a length of spring steel 50 is wound in a helix about two core pieces 52. Each core piece includes a shaft 54 that is encircled by the spring steel 50. The ends 51 of the core pieces 52 form hemispheres. The core pieces 52 are rotatable with respect to the strip 50 to prevent wear of the housing 10 at the ends of the slots 12 at which they are engaged by hardened pins 56 shown in FIG. 2. The helical strip 52 is slightly compressed when held between the roller housing 10 and the race 33 to ensure positive engagement. The shafts 54 of the core pieces 52 have a slightly smaller diameter than the inside of the helical strip 50 to permit this compression. Alternatively it is possible to use a plurality of short springs arranged end-to-end in place of each elongated spring 14. As the angle of the slots 12 with respect to the rotational axis of the wire increase, it is necessary to reduce the length of each roller element.

Figure 5:
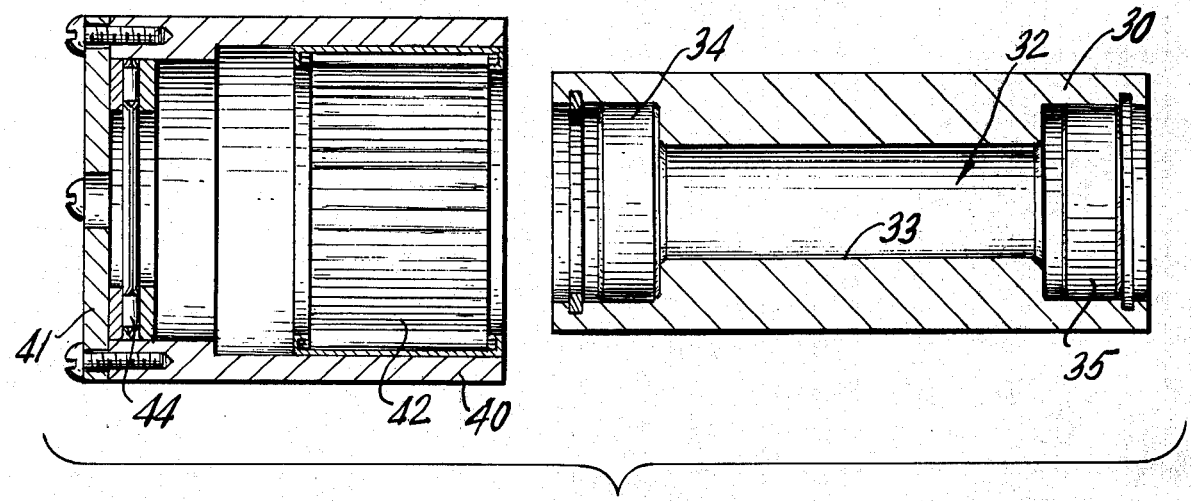
FIG. 5 shows additional components that may be used in combination with the mechanism of FIG. 1.

FIG. 5 shows a means for driving the rollers 14. It includes a cylindrical member 30 having a cylindrical bore 32 therein, the inner surface of which defines a race 33 that engages the rollers 14. At one end of the bore 32 is a thrust bearing 34 which engages an end surface 36 of the roller housing 10. The bearing 34 functions as a means for preventing axial linear movement between the roller housing 10 and the race 33 which would otherwise be produced by the rotation of the roller 14. Another bearing 35 is disposed about the opposite end of the bore 32.

Figure 6:
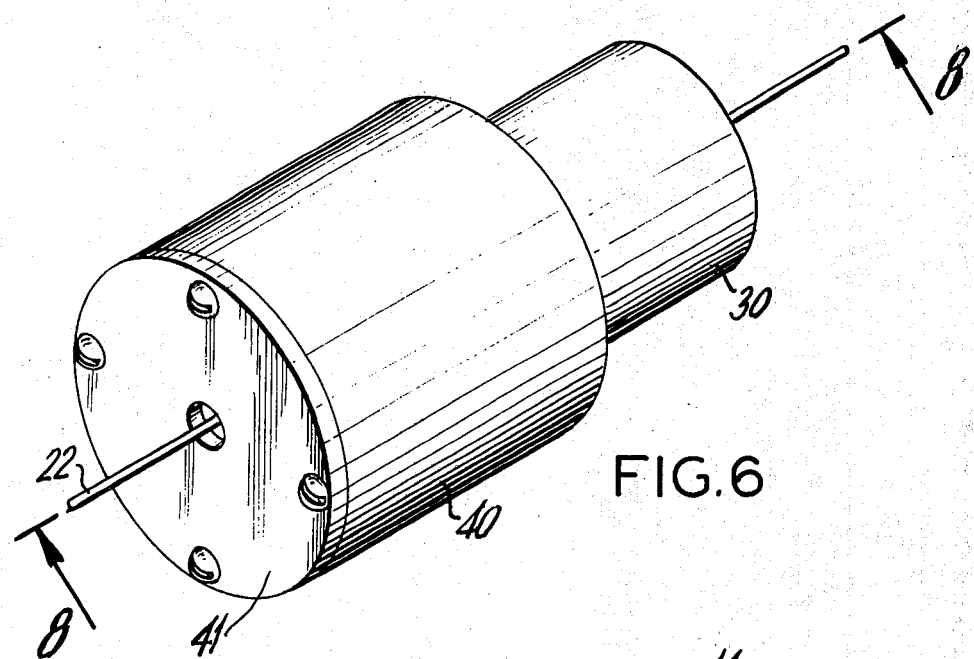
FIG. 6 is a pictorial view of an assembled apparatus including the components shown in FIGS. 1 and 5.

Also shown in FIG. 5 is a cylindrical shaped holder 40 having a cylindrical inner surface defined by an arrangement friction reducing roller bearings 42. The holder 40 has one closed end 41 at which a thrust bearing 44 is positioned. The outer surface of the member 30 fits within the cylinder defined by the roller bearings 42. An assembled device, including the optional holder 40, the member 30, and the roller housing 10, is shown in FIG. 6. The holder 40 partially covers the outer cylindrical surface of the member 30 which in turn partially encloses the outer cylindrical surface of the roller housing 10 while engaging the rollers 14.

Figure 8:
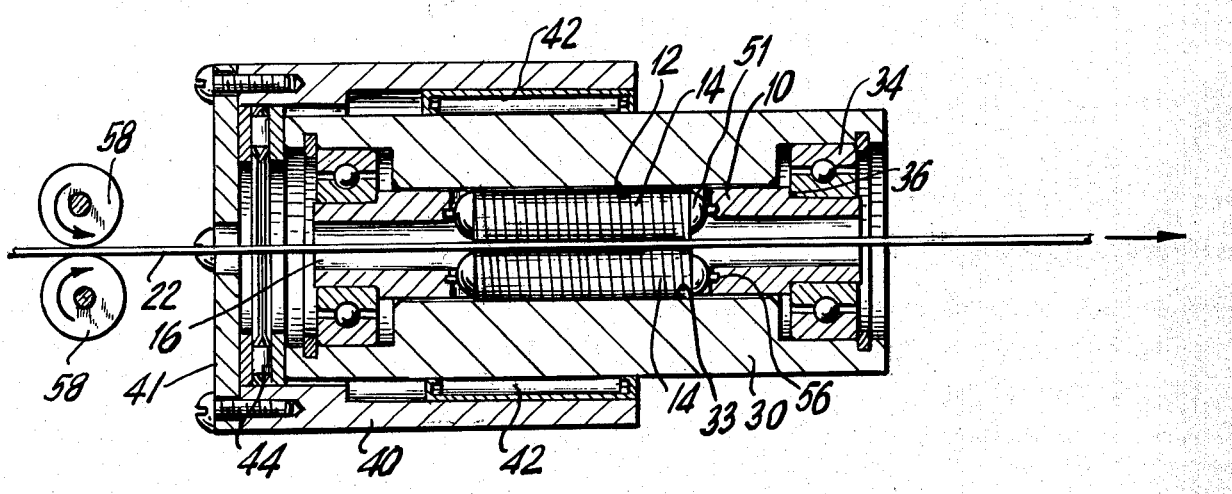
FIG. 8 is a cross-sectional view of an assembly including the components shown in FIGS. 1 and 5.

The assembled device of FIG. 6 is shown in cross-section in FIG. 8, the section being taken along the line 8–8. Also shown in FIG. 8 is pair of restraining rollers 58 that prevent rotation of the wire 22. If the application of the device is such that the wire 22 can be allowed to rotate, the lead speed of the wire 22 can be changed by either permitting or preventing rotation.

It should be noted that the rotation of the race 33 with respect to the roller housing 10 is only one of many possible arrangements for producing rotation of the rollers 14 relative to the wire 22. If, for example, the holder 40 is used to position the assembled device of FIG. 6, the race 33 defined by the member 30 can be permitted to rotate freely while the roller housing 10 is driven, in which case the rollers 14 are driven at a higher speed, the rotation being attributable to the rotational movement of the housing 10 relative to the wire 22. This produces a considerable lower mechanical advantage and a correspondingly higher speed of linear advancement than if either the member 30 or the housing 10 were driven at the same rotational speed while its counterpart was maintained in a stationary position.

One application of the mechanism is in feeding welding wire. Another application is use as a wire straightener in which the wire is straightened as it is fed between the guides 18 by movement of the rollers 14. The mechanism is also useful for the fine adjustment of the position of thin shafts (embraced within the term wire) to position various types of delicate instruments. It can also be used to open and close valves, since the mechanism is capable of operation at extremely high speeds and with low frictional force.

It will be obvious to those skilled in the art that the above-described embodiment is meant to be merely exemplary and that it is susceptible of modification and variation without departing from the spirit and scope of the invention. Therefore, the invention is not deemed to be limited except as defined by the appended claims.

We claim:

1. A mechanism for conversion between rotary and linear motion comprising a roller housing, a pair of flexible rollers each including a metal strip wound as a helix, a pair of slots defined by said housing with each of said rollers being rotatably positioned in one of said slots, means for rotatably driving said rollers to produce linear movement of a wire engaged by said rollers, a pair of wire positioning guides disposed along said rollers having opposing surfaces defining there between an interior channel through which a wire can be advanced linearly, said rollers and guides being positioned such that the rotational axes of the rollers form acute angles with respect to the channel.

2. The apparatus of claim 1, further comprising a race encircling said roller housing having a longitudinal axis coincident with said channel and being rotatable with respect thereto, said race engaging said rollers.

3. The mechanism of claim 1, wherein said slots are spiral shaped.

4. The mechanism of claim 1, wherein the roller housing defined two parallel slots within which the rollers are held.

5. The mechanism of claim 4, wherein the opposed edges of said wire positioning guides are spiral-shaped and parallel.

6. The mechanism of claim 4, wherein the wire positioning guides are free of engagement with the rollers.

7. The apparatus of claim 1, wherein said rollers have an outer surface formed by a length of metal wound in a helix.

8. The apparatus of claim 1, wherein each roller includes a metal strip wound in a helix and at least one core encircled by said strip and rotatable with respect thereto, said core projecting beyond said strip at at least one end thereof.

9. The mechanism of claim 2, further comprising means for preventing linear movement of said roller housing with respect to said race.

10. The mechanism of claim 9, wherein said linear movement preventing means is a thrust bearing.

11. The mechanism of claim 2, further comprising a holder having an inner surface defined by a plurality of friction reducing bearings, said race being defined by a cylindrical member the outer surface of which is engaged by said bearings.

* * * * *